US012451180B2

(12) United States Patent
Shang (10) Patent No.: US 12,451,180 B2
(45) Date of Patent: Oct. 21, 2025

(54) OFFSET CANCELLATION METHOD AND METHOD OF PREVENTING NOISE GENERATED DURING SENSING AND AMPLIFICATION (71) Applicant: Changxin Memory Technologies, Inc., Anhui (CN)

(72) Inventor: Weibing Shang, Hefei (CN)

(73) Assignee: Changxin Memory Technologies, Inc., Hefei (CN)

( * ) Notice: Subject to any disclaimer, the term of this patent is extended or adjusted under 35 U.S.C. 154(b) by 208 days.

(21) Appl. No.: 18/230,112

(22) Filed: Aug. 3, 2023

(65) Prior Publication Data
US 2024/0071474 A1    Feb. 29, 2024

Related U.S. Application Data (63) Continuation of application No. PCT/CN2022/124155, filed on Oct. 9, 2022.

(30) Foreign Application Priority Data

Aug. 29, 2022  (CN) .......................... 202211042478.1

(51) Int. Cl.
G11C 11/401    (2006.01)
G11C 11/408    (2006.01)
(Continued)

(52) U.S. Cl.
CPC ...... *G11C 11/4091* (2013.01); *G11C 11/4085* (2013.01); *G11C 11/4094* (2013.01)

(58) Field of Classification Search
CPC ............ G11C 11/4091; G11C 11/4085; G11C 11/4094; G11C 2207/002; G11C 7/065
See application file for complete search history.

(56) References Cited

U.S. PATENT DOCUMENTS 11,024,365 B1 *  6/2021  Seo ..................... G11C 11/4091
2010/0128514 A1   5/2010  Yoon et al.
(Continued)

FOREIGN PATENT DOCUMENTS

CN    112712837 A    4/2021
CN    114822617 A    7/2022
CN    114863961 A    8/2022

OTHER PUBLICATIONS

Translation of Written Opinion of the International Searching Authority International App. No. PCT /CN2022/124155, Mar. 22, 2023. (Year: 2023).*

(Continued)

*Primary Examiner* — Mushfique Siddique
(74) *Attorney, Agent, or Firm* — Sheppard Mullin Richter & Hampton LLP (57) ABSTRACT A method for controlling a sense amplifier chronologically includes an idle phase, an offset cancellation phase, a charge sharing phase, and a sensing and amplification phase. In the charge sharing phase, the method includes controlling the first node to connect to the complementary bit line for a first predetermined duration and the second node to connect to the bit line for the first predetermined duration, and then disconnecting the connection between the bit line and the second node and the connection between the first node and the complementary bit line. In the sensing and amplification phase, the method include controlling the first node to connect to the complementary bit line and the second node to connect to the bit line, so as to transmit an amplified voltage to the bit line and the complementary bit line.

20 Claims, 6 Drawing Sheets

(51) Int. Cl.
*G11C 11/4091* (2006.01)
*G11C 11/4094* (2006.01)

(56) References Cited

U.S. PATENT DOCUMENTS

| | | | |
|---|---|---|---|
| 2015/0036444 A1* | 2/2015 | Seo ................. | G11C 11/4091 365/210.1 |
| 2017/0069368 A1* | 3/2017 | Woo ................ | G11C 11/4094 |
| 2018/0182449 A1* | 6/2018 | Kim ................. | G11C 11/4094 |
| 2020/0075065 A1* | 3/2020 | Jeong .............. | H03F 1/0205 |
| 2021/0184871 A1* | 6/2021 | Kim ................. | H04L 9/3236 |
| 2022/0157369 A1* | 5/2022 | Kim ................. | G11C 11/4094 |
| 2023/0238053 A1* | 7/2023 | Shang ............. | G11C 11/4094 365/207 |

OTHER PUBLICATIONS

PCT International Search Report and the Written Opinion mailed Mar. 22, 2023, issued in related International Application No. PCT/CN2022/124155, with partial English machine translation (11 pages).

Jinyeong Moon et al., "Sense Amplifier with Offset Mismatch Calibration for Sub 1-V DRAM Core Operation", IEEE International Symposium on Circuits & Systems, May 2010, pp. 3501-3504.

Shunichi Suzuki et al., "Threshold Difference Compensated Sense Amplifier", IEEE Journal of Solid-State Circuits, vol. SC-14, No. 6, Dec. 1979, pp. 1066-1070.

* cited by examiner

S21 — In an idle phase, control a first node, a second node, a bit line, and a complementary bit line to connect to each other and connect to a predetermined equalization voltage S22 — In an offset cancellation phase, break the connection between the first node and the complementary bit line, the connection between the second node and the bit line, and the connection between the predetermined equalization voltage and each of the first node, the second node, the bit line, and the complementary bit line S23 — In a charge sharing phase, control the first node to connect to the complementary bit line for a first predetermined duration and the second node to connect to the bit line for the first predetermined duration, and then break the connection between the bit line and the second node and the connection between the first node and the complementary bit line S24 — In a sensing and amplification phase, when it is detected that a voltage on the first node or a voltage on the second node reaches a predetermined voltage, control the first node to connect to the complementary bit line and the second node to connect to the bit line, so as to transmit an amplified voltage to the bit line and the complementary bit line

| S231 | In a charge sharing phase, control a first node to connect to a second node for a second predetermined duration, and then break the connection between the first node and the second node |

| S232 | After the first node is disconnected from the second node, control the first node to connect to a complementary bit line for a first predetermined duration and the second node to connect to a bit line for the first predetermined duration, and then break the connection between the bit line and the second node and the connection between the first node and the complementary bit line |

S233 — In a charge sharing phase, control both a first node and a second node to connect to a predetermined equalization voltage while controlling the first node to connect to the second node S234 — Break the connection between the predetermined equalization voltage and each of the first node and the second node while breaking the connection between the first node and the second node

FIG. 12

OFFSET CANCELLATION METHOD AND METHOD OF PREVENTING NOISE GENERATED DURING SENSING AND AMPLIFICATION

CROSS-REFERENCE TO RELATED APPLICATIONS

This application is a continuation application of International Patent Application No. PCT/CN2022/124155, filed on Oct. 9, 2022, which claims priority to Chinese Patent Application No. 202211042478.1, filed on Aug. 29, 2022 and entitled "METHOD FOR CONTROLLING SENSE AMPLIFIER AND ELECTRONIC DEVICE". The above-referenced applications are incorporated herein by reference in their entirety.

TECHNICAL FIELD

The present invention relates to the field of integrated circuit technologies, and in particular, to a method for controlling a sense amplifier and an electronic device to which the control method is applied.

BACKGROUND

A sense amplifier (SA) is an important circuit for implementing data transmission in a memory. The sense amplifier is configured to amplify a small voltage difference on a bit line to enable writing and reading of storage units.

The sense amplifier mainly includes two inverters that are connected in series in a form of an input/output ring. An input terminal of one inverter is connected to a bit line, and an input terminal of the other inverter is connected to a complementary bit line. The sense amplifier internally controls on/off of transistors in the two inverters based on a voltage difference between the bit line and the complementary bit line to amplify the voltage difference. During sensing and amplification, the transistors in the two inverters could generate mismatches, thus forming noise. The noise is transmitted to other circuits in the memory through the bit line and the complementary bit line, affecting performance of the memory.

It should be noted that the information disclosed in the BACKGROUND section is used merely to enhance understanding of the background of the present invention, and therefore may include information that does not constitute the prior art known to a person of ordinary skill in the art.

SUMMARY

An objective of the present invention is to provide a method for controlling a sense amplifier and an electronic device to which the control method is applied, so as to overcome, at least to some extent, a problem that the sense amplifier generates noise during sensing and amplification due to restrictions and deficiencies of related technologies.

According to a first aspect of the present invention, a method for controlling a sense amplifier is provided, where the sense amplifier includes a first N-type transistor, a second N-type transistor, a first P-type transistor, and a second P-type transistor; a drain of the first N-type transistor, a drain of the first P-type transistor, and a gate of the second P-type transistor are connected to a first node; a drain of the second N-type transistor, a drain of the second P-type transistor, and a gate of the first P-type transistor are connected to a second node; a gate of the first N-type transistor is connected to a bit line and a gate of the second N-type transistor is connected to a complementary bit line; a source of the first P-type transistor and a source of the second P-type transistor are both configured to connect to a power supply voltage, and a source of the first N-type transistor and a source of the second N-type transistor are both configured to connect to ground; and the method for controlling a sense amplifier chronologically includes an idle phase, an offset cancellation phase, a charge sharing phase, and a sensing and amplification phase that occur in sequence, where: in the charge sharing phase, controlling the first node to connect to the complementary bit line for a first predetermined duration and the second node to connect to the bit line for the first predetermined duration, and then disconnecting the connection between the bit line and the second node and the connection between the first node and the complementary bit line; and in the sensing and amplification phase, when it is detected that a voltage on the first node or a voltage on the second node reaches a predetermined voltage, controlling the first node to connect to the complementary bit line and the second node to connect to the bit line, so as to transmit an amplified voltage to the bit line and the complementary bit line.

In some example embodiments of the present invention, the method further includes: in the idle phase, controlling the first node, the second node, the bit line, and the complementary bit line to connect to each other and connect to a predetermined equalization voltage; in the offset cancellation phase, disconnecting the connection between the first node and the complementary bit line, the connection between the second node and the bit line, and the connection between the predetermined equalization voltage and each of the first node, the second node, the bit line, and the complementary bit line; and in the charge sharing phase, after an activation signal is input to a word line corresponding to a storage unit connected to the sense amplifier, controlling the first node to connect to the complementary bit line for the first predetermined duration, and controlling the second node to connect to the bit line for the first predetermined duration.

In some example embodiments of the present invention, the method further includes, in the charge sharing phase: controlling the first node to connect to the second node for a second predetermined duration, and then disconnecting the connection between the first node and the second node; and after disconnecting the first node from the second node, controlling the first node to connect to the complementary bit line for the first predetermined duration and the second node to connect to the bit line for the first predetermined duration, and then disconnecting the connection between the bit line and the second node and the connection between the first node and the complementary bit line.

In some example embodiments of the present invention, the method further includes, in the charge sharing phase: while controlling the first node to connect to the second node, controlling both the first node and the second node to connect to the predetermined equalization voltage; and while disconnecting the connection between the first node and the second node, disconnecting the connection between the predetermined equalization voltage and each of the first node and the second node.

In some example embodiments of the present invention, the method further includes: in both the idle phase and the charge sharing phase, controlling the source of the first P-type transistor and the source of the second P-type transistor to disconnect from the power supply voltage, and controlling the source of the first N-type transistor and the source of the second N-type transistor to disconnect from the ground; and in both the offset cancellation phase and the sensing and amplification phase, controlling the source of the first P-type transistor and the source of the second P-type transistor to connect to the power supply voltage, and controlling the source of the first N-type transistor and the source of the second N-type transistor to connect to the power supply voltage.

In some example embodiments of the present invention, the sense amplifier includes a first switching transistor, a second switching transistor, a third switching transistor, and a fourth switching transistor, where a first terminal of the first switching transistor is connected to the first node, and a second terminal of the first switching transistor is connected to the complementary bit line; a first terminal of the second switching transistor is connected to the second node, and a second terminal of the second switching transistor is connected to the bit line; a first terminal of the third switching transistor is connected to the first node, and a second terminal of the third switching transistor is connected to the bit line; a first terminal of the fourth switching transistor is connected to the second node, and a second terminal of the fourth switching transistor is connected to the complementary bit line.

In some example embodiments of the present invention, the first switching transistor and the second switching transistor have same process parameters; in the charge sharing phase, the first switching transistor and the second switching transistor are turned on by a first voltage; in the sensing and amplification phase, a turn-on voltage of the first switching transistor and the second switching transistor gradually increases from the first voltage to a second voltage, so as to control the first switching transistor and the second switching transistor to be turned on; the first voltage is greater than or equal to a gate threshold voltage of the first switching transistor and the second switching transistor.

In some example embodiments of the present invention, the sense amplifier includes a precharge switching transistor, a first terminal of the precharge switching transistor is connected to the predetermined equalization voltage, a second terminal of the precharge switching transistor is configured to supply the predetermined equalization voltage, and the precharge switching transistor is configured to control at least one of the first node, the second node, the bit line, and the complementary bit line to connect to the predetermined equalization voltage or disconnect from the predetermined equalization voltage.

In some example embodiments of the present invention, the second terminal of the precharge switching transistor is connected to the first node, or the second terminal of the precharge switching transistor is connected to the second node.

In some example embodiments of the present invention, the second terminal of the precharge switching transistor is connected to the bit line, or the second terminal of the precharge switching transistor is connected to the complementary bit line.

In some example embodiments of the present invention, the sense amplifier includes an equalization switching transistor, a first terminal of the equalization switching transistor is connected to the first node, a second terminal of the equalization switching transistor is connected to the second node, and the equalization switching transistor is configured to control the first node to connect to the second node.

According to a second aspect of the present invention, an electronic device is provided, including: a memory, including a sense amplifier and a sense amplifier control circuit, where the sense amplifier control circuit is configured to perform the method described in any one of the above-mentioned embodiments, so as to control the sense amplifier to amplify a voltage difference between a bit line and a complementary bit line that are connected to the sense amplifier.

In some embodiments of the present invention, the bit line and the complementary bit line are disconnected from the node in the sense amplifier after the charge sharing phase, and the bit line and the complementary bit line are reconnected when it is detected that the voltage on the node has reached the predetermined voltage, thereby preventing the noise generated during sensing and amplification from being transmitted to the bit line and the complementary bit line, and reducing impact of the noise on the circuit during sensing and amplification.

It should be understood that the foregoing general descriptions and the following detailed descriptions are merely examples and explanations, and are not intended to limit the present invention.

BRIEF DESCRIPTION OF DRAWINGS

The accompanying drawings, which are incorporated in and form a part of this specification, illustrate some embodiments consistent with the present invention and, together with this specification, serve to explain the principles of the present invention. Clearly, the accompanying drawings in the following descriptions merely illustrate some embodiments of the present invention, and a person of ordinary skill in the art can derive other drawings from these accompanying drawings without creative efforts.

DESCRIPTION OF EMBODIMENTS

Example implementations are more comprehensively described below with reference to the accompanying drawings. However, the example implementations can be implemented in a plurality of forms, and should not be construed as being limited to some embodiments described herein. On the contrary, these implementations are provided to make the present invention more comprehensive and thorough, and to fully convey the concept of the example implementations to a person skilled in the art. The described features, structures, or characteristics may be combined in one or more implementations in any suitable manner. The foregoing descriptions provide many specific details to give sufficient understanding of the implementations of the present invention. However, a person skilled in the art should be aware that the technical solutions in the present invention can be implemented without one or more of the specific details, or by using another method, component, apparatus, step, or the like. In other cases, well-known technical solutions are not shown or described in detail, so as not to obscure some aspects of the present invention.

In addition, the accompanying drawings are merely schematic illustrations of the present invention. A same reference numeral in the figures represents a same or similar part, and therefore repeated descriptions of the part are omitted. Some of the block diagrams shown in the accompanying drawings are functional entities and do not necessarily correspond to physically or logically independent entities. These functional entities can be implemented in a software form, or in one or more hardware modules or integrated circuits, or in different networks and/or processor apparatuses and/or microcontroller apparatuses.

The example implementations of the present invention are described in detail below with reference to the accompanying drawings.

Figure 1:
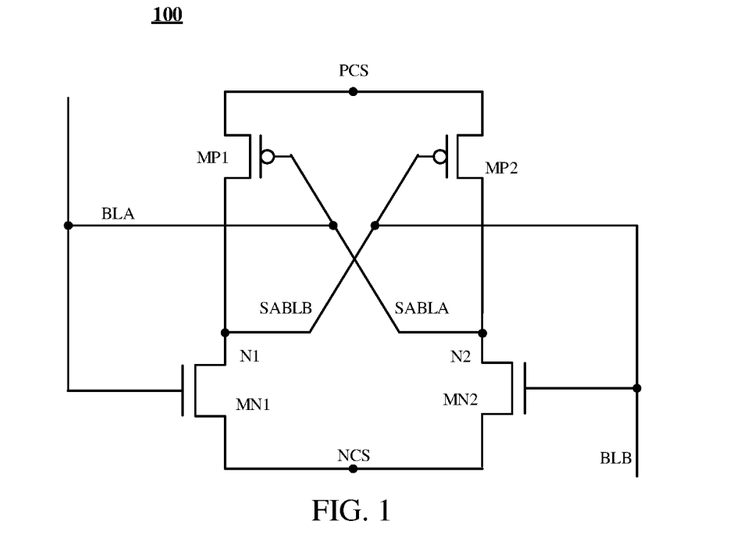
FIG. 1 is a schematic structural diagram of a sense amplifier.

FIG. 1 is a schematic structural diagram of a sense amplifier.

Referring to FIG. 1, a sense amplifier 100 may include: a first N-type transistor MN1, a second N-type transistor MN2, a first P-type transistor MP1, and a second P-type transistor MP2; a drain of the first N-type transistor MN1, a drain of the first P-type transistor MP1, and a gate of the second P-type transistor MP2 are connected to a first node N1; a drain of the second N-type transistor MN2, a drain of the second P-type transistor MP2, and a gate of the first P-type transistor MP1 are connected to a second node N2; a gate of the first N-type transistor MN1 is connected to a bit line BLA and a gate of the second N-type transistor MN2 is connected to a complementary bit line BLB; a source of the first P-type transistor MP1 and a source of the second P-type transistor MP2 are both configured to connect to a power supply voltage PCS, and a source of the first N-type transistor MN1 and a source of the second N-type transistor MN2 are both configured to connect to ground (connect to NCS); the second node N2 is connected to the bit line BLA, and the first node N1 is connected to the complementary bit line BLB.

It can be understood that, other circuits such as a storage unit and an input/output conversion circuit may be further connected to the bit line BLA and the complementary bit line BLB.

As can be seen from the sense amplifier circuit shown in FIG. 1, the first P-type transistor MP1 and the first N-type transistor MN1 form one inverter, and the second P-type transistor MP2 and the second N-type transistor MN2 form another inverter. Inputs and outputs of the two inverters are respectively connected to form one latch.

When potentials of the bit line BLA and the complementary bit line BLB are changed, causing potentials of the first node N1 and the second node N2 to be changed, a mismatch (mismatch) between the first P-type transistor MP1, the second P-type transistor MP2, the first N-type transistor MN1, and the second N-type transistor MN2 cannot be eliminated when a potential amplification process is implemented by using a turn-on difference between the first P-type transistor MP1, the second P-type transistor MP2, the first N-type transistor MN1, and the second N-type transistor MN2, and the noise of the first node N1 and the second node N2 is transmitted to the bit line BLA and the complementary bit line BLB in real time.

Figure 2:
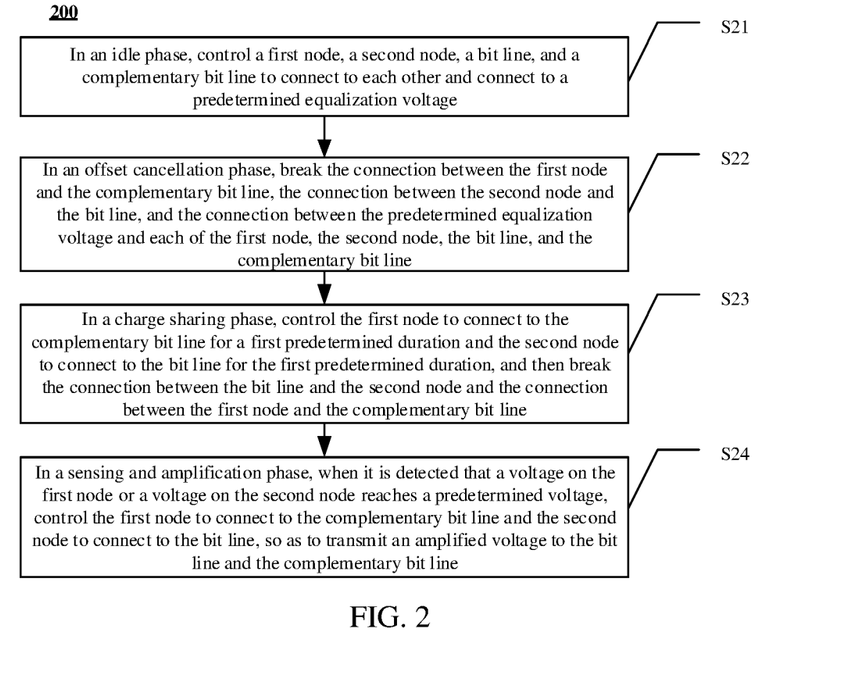
FIG. 2 is a flowchart of a method for controlling a sense amplifier according to some embodiments of the present invention.

FIG. 2 is a flowchart of a method for controlling a sense amplifier according to some embodiments of the present invention.

Referring to FIG. 2, the method 200 for controlling a sense amplifier may chronologically include an idle phase (Idle), an offset cancellation phase (Offset Cancel), a charge sharing phase (Charge Sharing), and a sensing and amplification phase (Sensing) that occur in sequence. The method 200 may be performed by the sense amplifier control circuit. The method 200 for controlling a sense amplifier may include:

Step S21: In the idle phase, control the first node, the second node, the bit line, and the complementary bit line to connect to each other and connect to a predetermined equalization voltage.

Step S22: In the offset cancellation phase, disconnect the connection between the first node and the complementary bit line, the connection between the second node and the bit line, and the connection between the predetermined equalization voltage and each of the first node, the second node, the bit line, and the complementary bit line.

Step S23: In the charge sharing phase, control the first node to connect to the complementary bit line for a first predetermined duration and the second node to connect to the bit line for the first predetermined duration, and then disconnect the connection between the bit line and the second node and the connection between the first node and the complementary bit line.

Step S24: In the sensing and amplification phase, when it is detected that a voltage on the first node or a voltage on the second node reaches a predetermined voltage, control the first node to connect to the complementary bit line and the second node to connect to the bit line, so as to transmit an amplified voltage to the bit line and the complementary bit line.

To implement the method 200 shown in FIG. 2, in some embodiments of the present invention, the sense amplifier 100 shown in FIG. 1 additionally includes a plurality of controllable switching elements.

Figure 3:
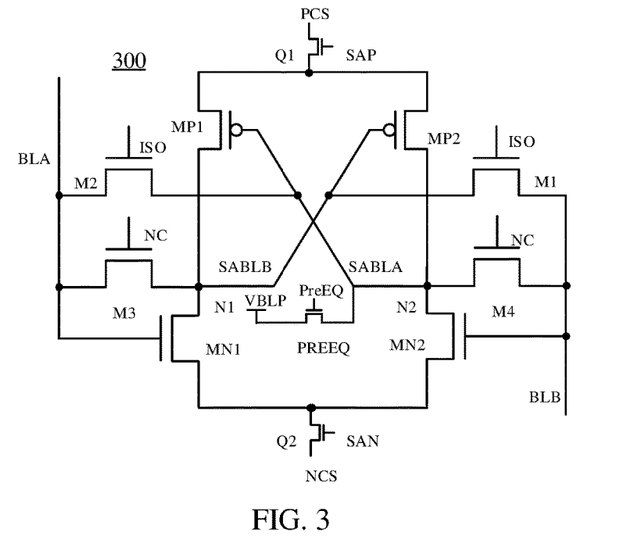
FIG. 3 is a schematic diagram of a sense amplifier according to some embodiments of the present invention.

FIG. 3 is a schematic diagram of a sense amplifier according to some embodiments of the present invention.

Referring to FIG. 3, in some embodiments, the sense amplifier 300 includes a first switching transistor M1, a second switching transistor M2, a third switching transistor M3, and a fourth switching transistor M4, where a first terminal of the first switching transistor M1 is connected to the first node N1, and a second terminal of the first switching transistor M1 is connected to the complementary bit line BLB; a first terminal of the second switching transistor M2 is connected to the second node N2, and a second terminal of the second switching transistor M2 is connected to the bit line BLA; a first terminal of the third switching transistor M3 is connected to the first node N1, and a second terminal of the third switching transistor M3 is connected to the bit line BLA; a first terminal of the fourth switching transistor M4 is connected to the second node N2, and a second terminal of the fourth switching transistor M4 is connected to the complementary bit line BLB.

Turn-on and turn-off of the third switching transistor M3 and the fourth switching transistor M4 are controlled by using an offset cancellation signal NC, and turn-on and turn-off of the first switching transistor M1 and the second switching transistor M2 are controlled by using an isolation control signal ISO.

In addition, the sense amplifier 300 further includes a precharge switching transistor PREEQ, a first terminal of the precharge switching transistor PREEQ is connected to the predetermined equalization voltage VBLP, a second terminal of the precharge switching transistor PREEQ is configured to supply the predetermined equalization voltage VBLP, and the precharge switching transistor PREEQ is configured to control at least one of the first node N1, the second node N2, the bit line BLA, and the complementary bit line BLB to connect to the predetermined equalization voltage VBLP or disconnect from the predetermined equalization voltage VBLP. In some embodiments shown in FIG. 3, the second terminal of the precharge switching transistor PREEQ is connected to the second node N2. However, in some other embodiments of the present invention, the second terminal of the precharge switching transistor PREEQ may alternatively be connected to the first node N1, or to the bit line BLA, or to the complementary bit line BLB. Regardless of which node is connected, the precharge switching transistor PREEQ is configured to supply the predetermined equalization voltage VBLP to the first node N1, the second node N2, the bit line BLA, and the complementary bit line BLB when the four nodes are connected to each other in the idle phase.

In some embodiments shown in FIG. 3, the source of the first P-type transistor and the source of the second P-type transistor are connected to the power supply voltage PCS through a first power supply control switching transistor Q1, and a control signal of the first power supply control switching transistor Q1 is SAP; the source of the first N-type transistor and the source of the second N-type transistor are connected to the ground voltage NCS through a second power supply control switching transistor Q2, and a control signal of the second power supply control switching transistor Q2 is SAN.

Figure 4:
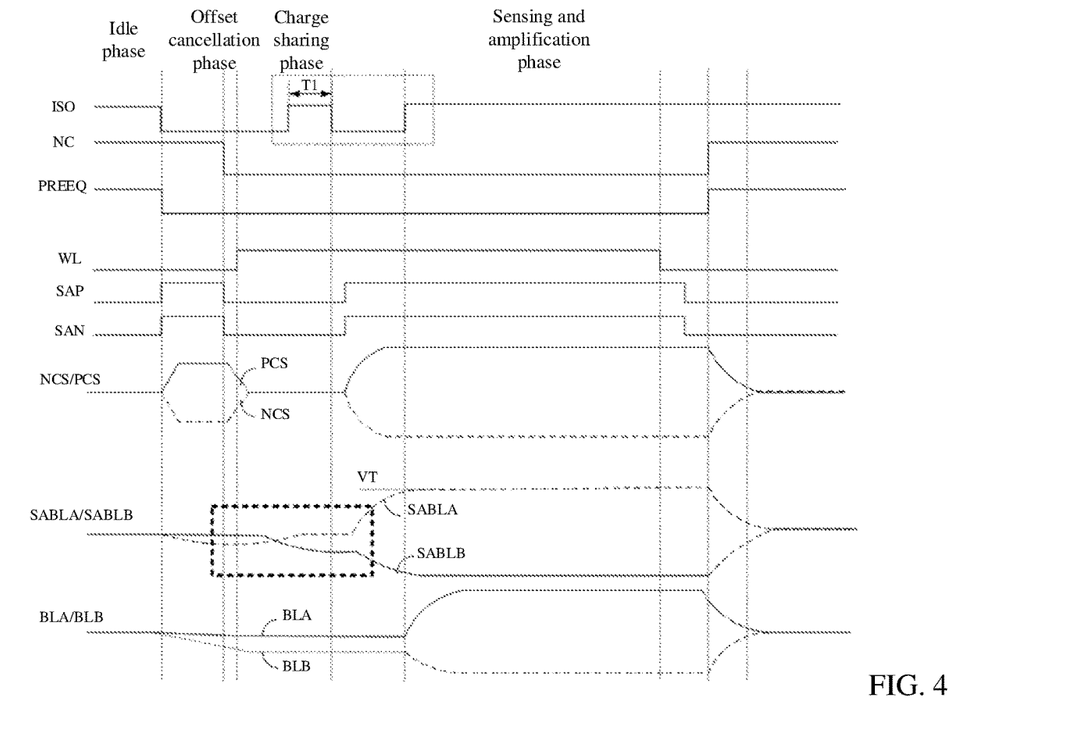
FIG. 4 is a time sequence diagram for implementing the control method shown in FIG. 2 based on a sense amplifier circuit shown in FIG. 3.

FIG. 4 is a time sequence diagram for implementing a control method shown in FIG. 2 based on a sense amplifier circuit shown in FIG. 3.

Referring to FIG. 2, FIG. 3, and FIG. 4, in the idle phase, the first switching transistor M1, the second switching transistor M2, the third switching transistor M3, the fourth switching transistor M4, and the precharge switching transistor PREEQ are all controlled to be turned on, so that the first node N1, the second node N2, the bit line BLA, and the complementary bit line BLB are connected to each other and connected to the predetermined equalization voltage VBLP. Such a process is also referred to as a precharge phase in which nodes of the sense amplifier 300 are precharged. In some embodiments shown in FIG. 3, the precharge switching transistor PREEQ is disposed as an N-type switching transistor, a signal PreEQ is used to denote the control signal of the precharge switching transistor PREEQ, and an enable level is a high level. In some other embodiments, the precharge switching transistor PREEQ may alternatively be a P-type switching transistor, and a corresponding enable level is a low level. Therefore, to generalize the control logic in some embodiments, in the time sequence diagram shown in FIG. 4, PREEQ is used to denote an on/off state of the precharge switching transistor PREEQ. The PREEQ having a high level indicates that the precharge switching transistor PREEQ is in an on state. The PREEQ having a low level indicates that the precharge switching transistor PREEQ is in an off state. The same rule applies to other transistors, and repeated descriptions are not provided below.

In the offset cancellation phase, the isolation control signal ISO is used to control the first switching transistor M1 and the second switching transistor M2 to be turned off, so as to disconnect the connection between the first node N1 and the complementary bit line BLB, and the connection between the second node N2 and the bit line BLA. In addition, the precharge switching transistor PREEQ is controlled to be turned off, so as to disconnect the connection between the predetermined equalization voltage VBLP and each of the first node N1, the second node N2, the bit line BLA, and the complementary bit line BLB.

In the charge sharing phase, the isolation control signal ISO is used to control the first switching transistor M1 and the second switching transistor M2 to be turned on for a first predetermined duration T1 and then turned off, thereby controlling the first node N1 to be connected to the complementary bit line BLB for the first predetermined duration T1 and the second node N2 to be connected to the bit line BLA for the first predetermined duration T1, and then disconnecting the connection between the bit line BLA and the second node N2, and the connection between the first node N1 and the complementary bit line BLB. In the charge sharing phase, after an activation signal (WL ON) is input to a word line corresponding to a storage unit connected to the sense amplifier 300, the first node N1 may be controlled to connect to the complementary bit line BLB for the first predetermined duration T1, and the second node N2 may be controlled to connect to the bit line BLA for the first predetermined duration T1. It should be noted that, after the first switching transistor M1 and the second switching transistor M2 are turned on for the first predetermined time period T1, they are to be turned off before the sense amplifier is enabled, so as to prevent noise generated after the sense amplifier is enabled from be transmitted to the bit line BLA and the complementary bit line BLB.

In the sensing and amplification phase, when it is detected that a voltage on the first node N1 or a voltage on the second node N2 reaches a predetermined voltage VT, the isolation control signal ISO is used to control the first switching transistor M1 and the second switching transistor M2 to be turned on, so as to control the first node N1 to connect to the complementary bit line BLB and the second node N2 to connect to the bit line BLA, and transmit an amplified voltage to the bit line BLA and the complementary bit line BLB. The predetermined voltage VT may be a power supply voltage and is used to indicate that a minor voltage difference on the bit line BLA and the complementary bit line BLB has been amplified to an easily detected value during sensing and amplification, and the bit line BLA and the complementary bit line BLB are allowed to obtain a voltage difference amplification result.

In the offset cancellation phase, the first node N1, the second node N2, the bit line BLA, and the complementary bit line BLB are disconnected from the predetermined equalization voltage VBLP, and the connection between the first node N1 and the complementary bit line BLB, and the connection between the second node N2 and the bit line BLA are both broken. Consequently, the bit line BLA is affected by a storage unit in which data has been stored or a local signal line for transmitting data to a storage unit, and a minor voltage change occurs, thereby generating a voltage difference between the bit line BLA and the complementary bit line BLB.

After the offset cancellation phase ends, voltage information stored on internal nodes SABLA (the second node N2) and SABLB (the first node N1) of the sense amplifier 300 is opposite to voltage information on the bit line BLA and the complementary bit line BLB. In the charge sharing phase and before the sensing and amplification process starts, after the first switching transistor M1 and the second switching transistor M2 are turned on, great noise occurs between the connected internal node SABLA and the bit line BLA, and between the connected internal node SABLB and the complementary bit line BLB due to existence of the voltage difference. The noise may reach 20 mV to 30 mV, and an input voltage difference amplitude on the bit line BLA and the complementary bit line BLB ranges from 60 mV to 90 mV in the DRAM advanced process. Consequently, the noise greatly affects an effective sense margin (sense margin). The noise is maintained until the voltages of the internal node SABLA and the bit line BLA are equal, and the voltages of the internal node SABLB and the complementary bit line BLB are equal.

As can be learned from some embodiments shown in FIG. 2 and FIG. 4, in the process from the second half of the charge sharing phase to the end of the sensing and amplification phase, since the connection between the bit line BLA and the second node N2, and the connection between the first node N1 and the complementary bit line BLB are broken, noise generated by the sense amplifier 300 during sensing and amplification is stored on the internal nodes SABLA and SABLB of the sense amplifier 300, and cannot be transmitted to the bit line BLA and the complementary bit line BLB. After the sensing and amplification process reaches a specific phase, the voltage difference between the internal node SABLA and the bit line BLA, and the voltage difference between the internal node SABLB and the complementary bit line BLB are both eliminated, and the noise generated during sensing and amplification disappears (or is weakened to an acceptable level). In such case, the first switching transistor M1 and the second switching transistor M2 are turned on, and the amplified voltage is transmitted to the bit line BLA and the complementary bit line BLB, thereby effectively reducing impact of the noise on the bit line BLA and the complementary bit line BLB.

In the charge sharing phase, the first node N1 is connected to the complementary bit line BLB for the first predetermined duration T1, and the second node N2 is connected to the bit line BLA for the first predetermined duration T1, and then the two nodes are disconnected. Such arrangement is intended to transmit small signals on the bit line BLA and the complementary bit line BLB to the internal nodes SABLA and SABLB. Otherwise, the internal nodes always store signals that are opposite to those on the bit line BLA and the complementary bit line BLB, and such signals are invalid signals that react, which compromise performance of the sense amplifier.

It should be noted that, referring to FIG. 4, in some embodiments of the present invention, in both the idle phase and the charge sharing phase, the source of the first P-type transistor and the source of the second P-type transistor are controlled to disconnect from the power supply voltage PCS, and the source of the first N-type transistor and the source of the second N-type transistor are controlled to disconnect from the ground NCS; and in both the offset cancellation phase and the sensing and amplification phase, the source of the first P-type transistor and the source of the second P-type transistor are controlled to connect to the power supply voltage PCS, and the source of the first N-type transistor and the source of the second N-type transistor are controlled to connect to the ground NCS.

The above-mentioned power supply control can be implemented by using switching transistors connected to the power supply voltage PCS and the ground voltage NCS, such as the first power supply control switching transistor Q1 and the second power supply control switching transistor Q2 in FIG. 3. Correspondingly, the control signal of the first power supply control switching transistor Q1 is SAP, and the control signal of the second power supply control switching transistor Q2 is SAN. Time sequences of SAP and SAN are shown in FIG. 4. The node PCS of the source of the first P-type transistor and the source of the second P-type transistor, and the node NCS of the source of the first N-type transistor and the source of the second N-type transistor are also schematically shown in FIG. 4.

Figure 5:
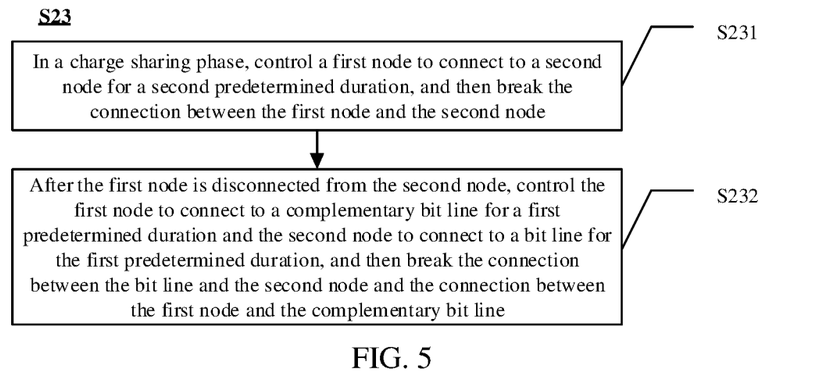
FIG. 5 is a schematic diagram of a method for controlling a sense amplifier according to some other embodiments of the present invention.

FIG. 5 is a schematic diagram of a method for controlling a sense amplifier according to some other embodiments of the present invention. The method may be performed by a sense amplifier control circuit.

Referring to FIG. 5, in some example embodiments of the present invention, step S23 may further include:

Step S131: In the charge sharing phase, control the first node to connect to the second node for a second predetermined duration, and then disconnect the connection between the first node and the second node.

Step S132: After the first node is disconnected from the second node, control the first node to connect to the complementary bit line for a first predetermined duration and the second node to connect to the bit line for the first predetermined duration, and then disconnect the connection between the bit line and the second node and the connection between the first node and the complementary bit line.

To implement some embodiments shown in FIG. 5, a controllable switching element may be disposed between the first node N1 and the second node N2.

Figure 6:
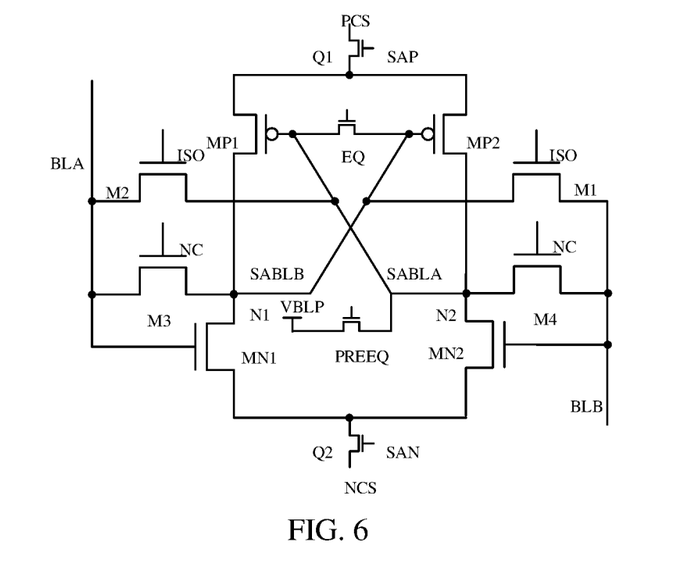
FIG. 6 is a schematic diagram of a sense amplifier corresponding to some embodiments.

FIG. 6 is a schematic diagram of a sense amplifier corresponding to some embodiments shown in FIG. 5.

Referring to FIG. 6, an equalization switching transistor EQ is further disposed between the first node N1 and the second node N2, a first terminal of the equalization switching transistor EQ is connected to the first node N1, a second terminal of the equalization switching transistor EQ is connected to the second node N2, and the equalization switching transistor EQ is configured to control the first node N1 to connect to the second node N2.

In some embodiments in FIG. 4 and FIG. 6 of the present invention, the switching elements (the precharge switching transistor PREEQ and the equalization switching transistor EQ) are all arranged as N-type transistors, and correspondingly in the control time sequence, a high level indicates that the switching elements are turned on, and a low level indicates that the switching elements are turned off. However, in some embodiments of the present invention, the above-mentioned switching elements may alternatively be P-type transistors or other controllable switching elements. Correspondingly, in the control time sequence, the level of the turn-on control signal and the level of the turn-off control signal of the switching elements may change accordingly, which is not particularly limited in the present invention.

Figure 7:
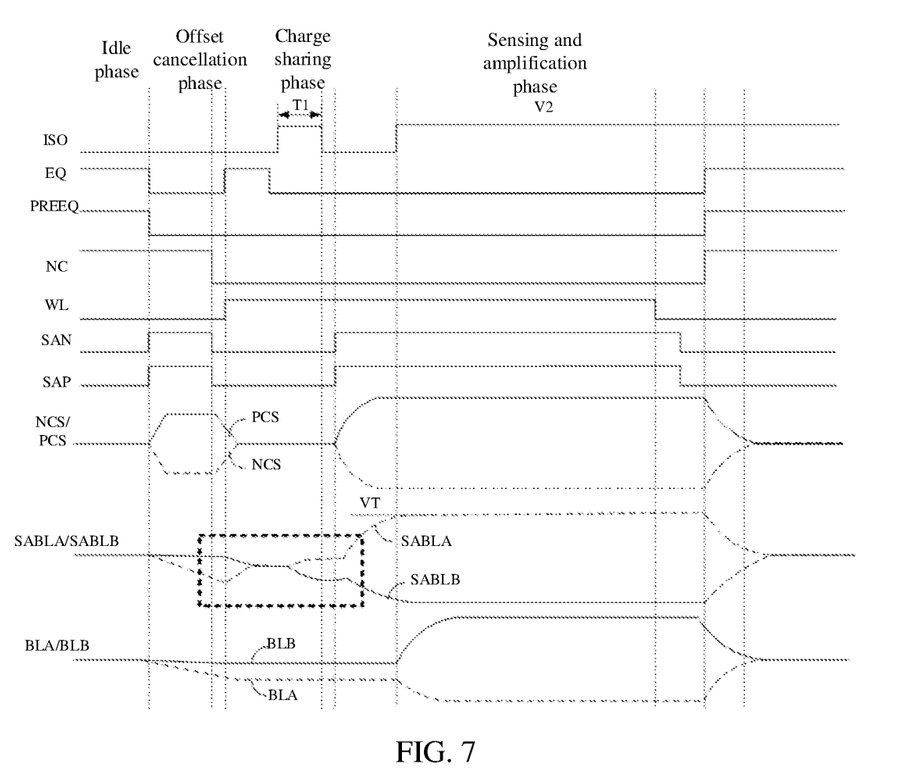
FIG. 7 is a time sequence diagram for implementing a control method shown in FIG. 5 based on a sense amplifier circuit shown in FIG. 6.

FIG. 7 is a time sequence diagram for implementing a control method shown in FIG. 5 based on a sense amplifier circuit shown in FIG. 6.

Referring to FIG. 5, FIG. 6, and FIG. 7, before the information on the bit line BLA and the complementary bit line BLB is transmitted to the internal nodes SABLA and SABLB, the internal nodes SABLB and SABLA (i.e., the first node N1 and the second node N2) are turned on for the second predetermined duration T2. Such arrangement can eliminate an invalid voltage difference on the internal nodes in advance, so as to further reduce noise generated when the small signals on the bit line BLA and the complementary bit line BLB are transmitted to the internal nodes, and reduce impact of the noise on the bit line BLA and the complementary bit line BLB during the signal transmission in the first predetermined duration T1.

In the time sequence diagram shown in FIG. 7, the equalization switching transistor EQ is turned on in the idle phase, the first node N1 is controlled to connect to the second node N2 (i.e., the internal node SABLB is connected to the internal node SABLA), and the offset cancellation signal NC is in an enabled state in the idle phase, so that the bit line BLA is connected to the first node N1/the internal node SABLB, and the complementary bit line BLB is connected to the second node N2/the internal node SABLA. Therefore, in the idle phase, it is not necessary to control the isolation control signal ISO to be in the enabled state in the idle phase in order to connect the bit line BLA to the internal node SABLA, and connect the complementary bit line BLB to the internal node SABLB. In the idle phase, the isolation control signal ISO is set to be in a disabled state to reduce power consumption of the circuit.

As can be seen from the signal change process of SABLA and SABLB in FIG. 7, the change of the signal voltage difference in the dashed line box is smoother than the change process in the dashed line box in FIG. 4, thereby better helping reduce the noise.

Figure 8:
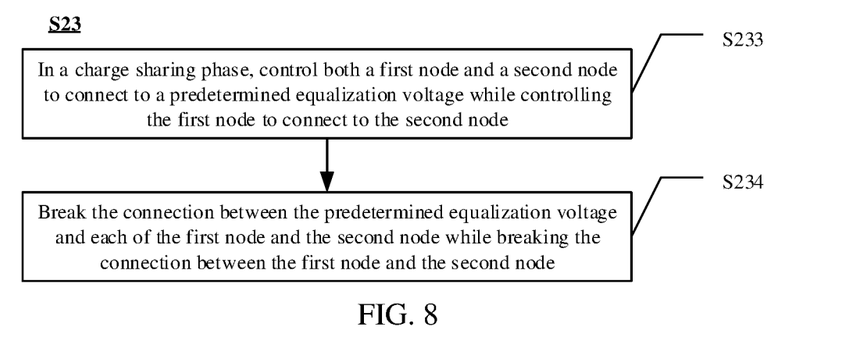
FIG. 8 is a schematic diagram of a method for controlling a sense amplifier according to still some other embodiments of the present invention.

FIG. 8 is a schematic diagram of a method for controlling a sense amplifier according to still some other embodiments of the present invention. The method may be performed by a sense amplifier control circuit.

Referring to FIG. 8, in some example embodiments of the present invention, step S23 may further include:

Step S233: In the charge sharing phase, control both the first node and the second node to connect to the predetermined equalization voltage while controlling the first node to connect to the second node.

Step S234: Disconnect the connection between the predetermined equalization voltage and each of the first node and the second node while disconnecting the connection between the first node and the second node.

Some embodiments shown in FIG. 8 can also be implemented using the circuit shown in FIG. 6.

Figure 9:
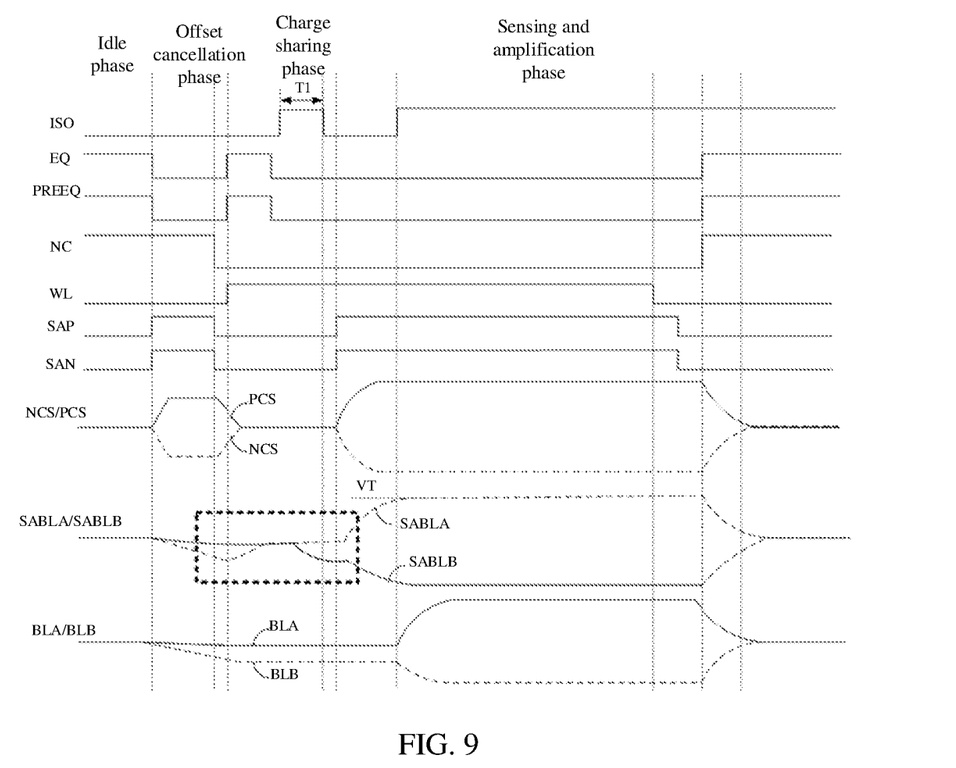
FIG. 9 is a time sequence diagram for implementing a control method shown in FIG. 8 based on a sense amplifier circuit shown in FIG. 6.

FIG. 9 is a time sequence diagram for implementing a control method shown in FIG. 8 based on a sense amplifier circuit shown in FIG. 6.

Referring to FIG. 9, while the voltages of the first node N1 and the second node N2 are set to be equal, the voltages of the first node N1 and the second node N2 are both controlled to be equal to the predetermined equalization voltage VBLP, thereby further reducing the voltage difference between the internal nodes SABLB and SABLA and the voltage difference between the internal node SABLB and the complementary bit line BLB (in this phase, the complementary bit line BLB usually maintains the previous predetermined equalization voltage VBLP), and further reducing the impact of the noise on the bit line BLA and the complementary bit line BLB during the signal transmission in the first predetermined duration T1. As can be seen from the signal change process of SABLA and SABLB in FIG. 9, the signal change in the dashed line box is smoother than that in the dashed line box shown in FIG. 7, thereby better helping reduce the noise.

Figure 10:
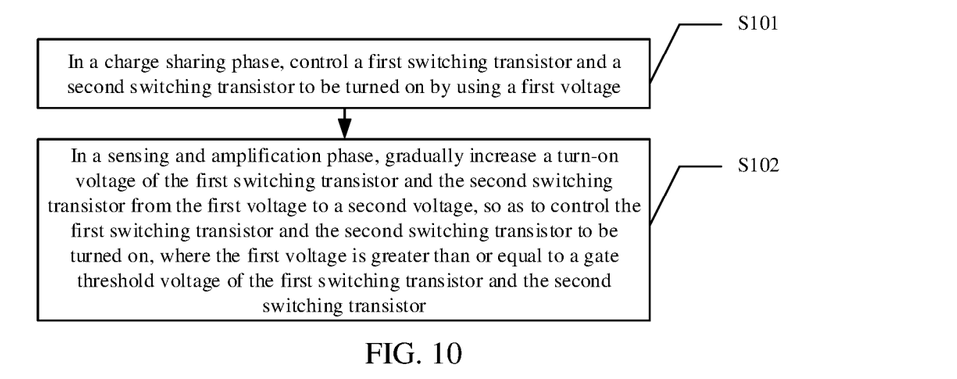
FIG. 10 is a schematic diagram of a method for controlling a sense amplifier according to still some other embodiments of the present invention.

FIG. 10 is a schematic diagram of a method for controlling a sense amplifier according to still some other embodiments of the present invention. The method may be performed by a sense amplifier control circuit.

Referring to FIG. 10, process parameters of the first switching transistor M1 and the second switching transistor M2 may be set to be the same. Further, the methods for controlling a sense amplifier shown in FIG. 2, FIG. 5, and FIG. 8 may each include:

Step S101: In the charge sharing phase, control the first switching transistor and the second switching transistor to be turned on by using the first voltage.

Step S102: In the sensing and amplification phase, gradually increase a turn-on voltage of the first switching transistor and the second switching transistor from the first voltage to a second voltage, so as to control the first switching transistor and the second switching transistor to be turned on, where the first voltage is greater than or equal to a gate threshold voltage of the first switching transistor and the second switching transistor.

The method shown in FIG. 10 can be implemented using any one of the sense amplifier circuits in FIG. 3 or FIG. 6.

Figure 11:
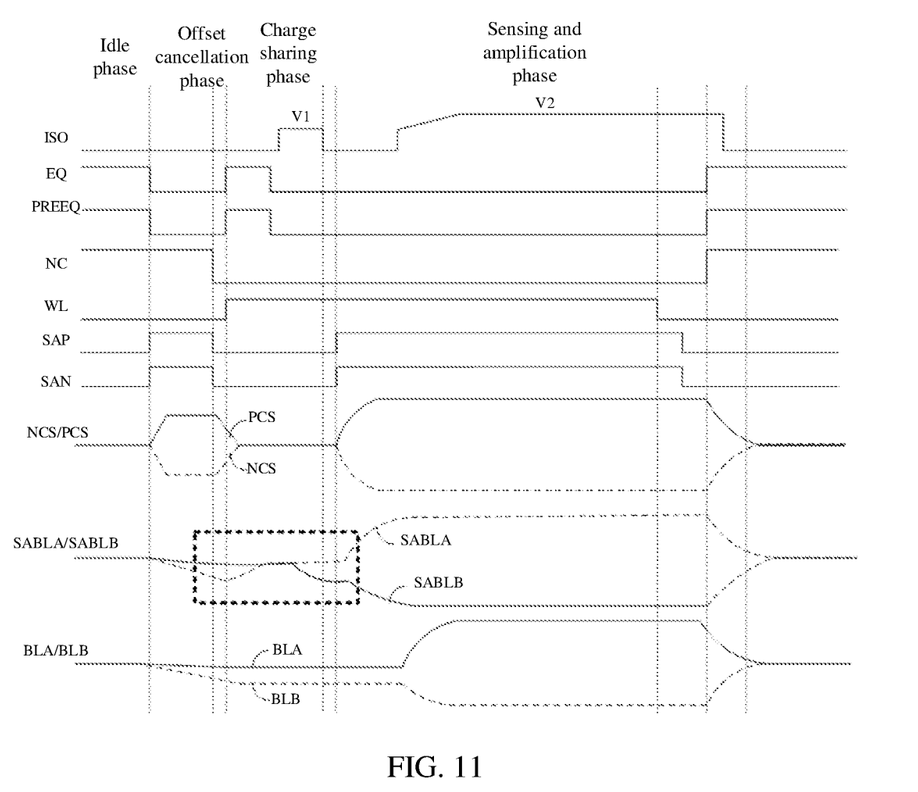
FIG. 11 is a schematic diagram of a time sequence of an isolation control signal ISO in a method for controlling a sense amplifier shown in FIG. 10.

FIG. 11 is a schematic diagram of a time sequence of an isolation control signal ISO in a method for controlling a sense amplifier shown in FIG. 10.

Referring to FIG. 11, in the charge sharing phase, when the isolation control signal ISO is in the enabled state, an enable voltage of the isolation control signal ISO may be set to be equal to the first voltage V1. The first voltage V1 is greater than or equal to the gate threshold voltage of the first switching transistor M1 and the second switching transistor M2.

In the sensing and amplification phase, when the isolation control signal ISO enters the enabled state and is kept in the enabled state, the enable voltage of the isolation control signal ISO may be gradually increased from the first voltage V1 to the second voltage V2. The second voltage V2 may be equal to the power supply voltage, or a gate control voltage of an N-type transistor common to the current circuit.

Since the small signal transmitted in the charge sharing phase does not have a large amplitude, signal transmission can also be implemented by inputting a low control voltage to the first switching transistor M1 and the second switching transistor M2. Therefore, in some embodiments shown in FIG. 10, different switching voltages may be used based on requirements of different control phases to reduce the power consumption and noise of the sense amplifier and reduce the power consumption during the signal transmission.

In conclusion, according to the sense amplifier circuit provided in some embodiments of the present invention, an additional toggle (toggle) time sequence is added to the control time sequence, so that when the sense amplifier starts to operate, the internal nodes of the sense amplifier start to effectively sense and amplify the data at the same time, and first store a sensing and amplification result on the internal nodes, instead of transmitting the sensing and amplification result to the external bit line and complementary bit line. The internal node amplifies the data to a specific amplitude before transmitting the data to the external node, thereby effectively preventing the noise generated by mismatch during sensing and amplification from being transmitted to the external node, and resolving the adaptation elimination problem and the noise elimination problem of the sense amplifier. As such, impact of various mismatches and system errors on the memory can be reduced, and structure changes of various sense amplifiers can adapt to various time sequence combinations.

Figure 12:
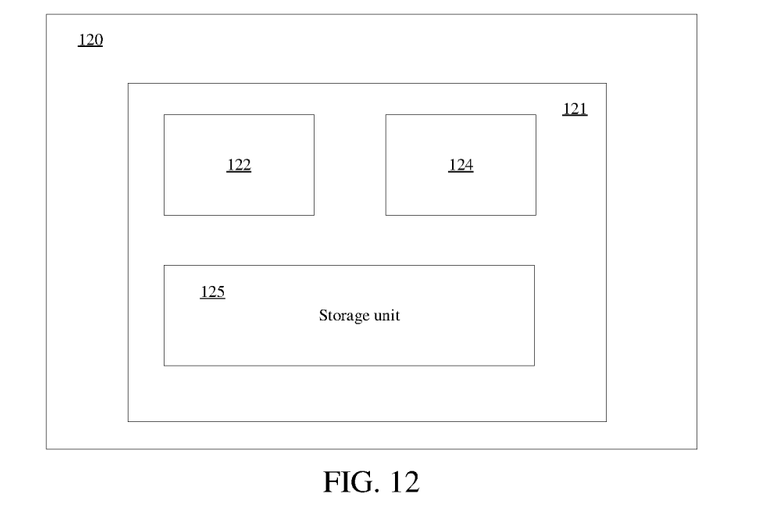
FIG. 12 is a schematic diagram of an electronic device.

According to a second aspect of the present invention, with reference to FIG. 12, an electronic device 120 is provided. The electronic device 120 includes a memory 121, that includes a sense amplifier 122 and a sense amplifier control circuit 124, where the sense amplifier control circuit 124 is configured to perform the method described in any one of the above-mentioned embodiments, so as to control the sense amplifier 122 to amplify a voltage difference between a bit line and a complementary bit line of a storage unit 125 that are connected to the sense amplifier 122.

It should be noted that although several modules or units of the device for performing actions are mentioned in the foregoing detailed description, such division is not mandatory. In fact, according to some implementations of the present invention, the features and functions of the two or more modules or units described above may be embodied in one module or unit. Conversely, a feature and function of one module or unit described above may be further divided for implementation by a plurality of modules or units.

After reviewing the specification and practicing the invention disclosed herein, a person skilled in the art could easily figure out other implementating solutions of the present invention. This application is intended to cover any variations, functions, or adaptive changes of the present invention that comply with general principles of the present invention, and could include common knowledge or a commonly used technical means in the technical field that is not disclosed in the present invention. This specification and some embodiments are merely considered as examples, and the actual scope and the concept of the present invention are defined by the appended claims.

INDUSTRIAL APPLICABILITY

In some embodiments of the present invention, the bit line and the complementary bit line are disconnected from the node in the sense amplifier after the charge sharing phase, and the bit line and the complementary bit line are reconnected when it is detected that the voltage on the node has reached the predetermined voltage, thereby preventing the noise generated during sensing and amplification from being transmitted to the bit line and the complementary bit line, and reducing impact of the noise on the circuit during sensing and amplification.

What is claimed is:

1. A method for controlling a sense amplifier, wherein the sense amplifier comprises a first N-type transistor, a second N-type transistor, a first P-type transistor, and a second P-type transistor; a drain of the first N-type transistor, a drain of the first P-type transistor, and a gate of the second P-type transistor are connected to a first node; a drain of the second N-type transistor, a drain of the second P-type transistor, and a gate of the first P-type transistor are connected to a second node; a gate of the first N-type transistor is connected to a bit line and a gate of the second N-type transistor is connected to a complementary bit line; a source of the first P-type transistor and a source of the second P-type transistor are configured to connect to a power supply voltage, and a source of the first N-type transistor and a source of the second N-type transistor are configured to connect to ground; and the method for controlling the sense amplifier chronologically comprises an idle phase, an offset cancellation phase, a charge sharing phase, and a sensing and amplification phase that occur in sequence, wherein:

in the charge sharing phase, during which an activation signal is input to a word line corresponding to a storage unit connected to the sense amplifier, controlling the first node to connect to the complementary bit line for a first predetermined duration and controlling the second node to connect to the bit line for the first predetermined duration, and then disconnecting the connection between the bit line and the second node and the connection between the first node and the complementary bit line; and in the sensing and amplification phase, in response to detecting that a voltage on the first node or a voltage on the second node reaches a predetermined voltage, controlling the first node to connect to the complementary bit line and the second node to connect to the bit line, to transmit an amplified voltage to the bit line and the complementary bit line.

2. The method according to claim 1, further comprising:

in the idle phase, controlling the first node, the second node, the bit line, and the complementary bit line to connect to each other and connect to a predetermined equalization voltage;

in the offset cancellation phase, disconnecting the connection between the first node and the complementary bit line, the connection between the second node and the bit line, and the connection between the predetermined equalization voltage and each of the first node, the second node, the bit line, and the complementary bit line; and in the charge sharing phase, controlling the first node to connect to the complementary bit line for the first predetermined duration, and controlling the second node to connect to the bit line for the first predetermined duration.

3. The method according to claim 2, further comprising, in the charge sharing phase:

controlling the first node to connect to the second node for a second predetermined duration, and then disconnecting the connection between the first node and the second node; and after disconnecting the first node from the second node, controlling the first node to connect to the complementary bit line for the first predetermined duration and the second node to connect to the bit line for the first predetermined duration, and then disconnecting the connection between the bit line and the second node and the connection between the first node and the complementary bit line.

4. The method according to claim 3, further comprising, in the charge sharing phase:

while controlling the first node to connect to the second node, controlling both the first node and the second node to connect to the predetermined equalization voltage; and while disconnecting the connection between the first node and the second node, disconnecting the connection between the predetermined equalization voltage and each of the first node and the second node.

5. The method according to claim 2, wherein the sense amplifier comprises a precharge switching transistor, a first terminal of the precharge switching transistor is connected to the predetermined equalization voltage, a second terminal of the precharge switching transistor is configured to supply the predetermined equalization voltage, and the precharge switching transistor is configured to control at least one of the first node, the second node, the bit line, and the complementary bit line to connect to the predetermined equalization voltage or disconnect from the predetermined equalization voltage.

6. The method according to claim 5, wherein the second terminal of the precharge switching transistor is connected to the first node, or the second terminal of the precharge switching transistor is connected to the second node.

7. The method according to claim 5, wherein the second terminal of the precharge switching transistor is connected to the bit line, or the second terminal of the precharge switching transistor is connected to the complementary bit line.

8. The method according to claim 5, wherein the sense amplifier comprises an equalization switching transistor, a first terminal of the equalization switching transistor is connected to the first node, a second terminal of the equalization switching transistor is connected to the second node, and the equalization switching transistor is configured to control the first node to connect to the second node.

9. The method according to claim 1, further comprising:
in both the idle phase and the charge sharing phase, controlling the source of the first P-type transistor and the source of the second P-type transistor to disconnect from the power supply voltage, and controlling the source of the first N-type transistor and the source of the second N-type transistor to disconnect from the ground; and
in both the offset cancellation phase and the sensing and amplification phase, controlling the source of the first P-type transistor and the source of the second P-type transistor to connect to the power supply voltage, and controlling the source of the first N-type transistor and the source of the second N-type transistor to connect to the power supply voltage.

10. The method according to claim 1, wherein the sense amplifier comprises a first switching transistor, a second switching transistor, a third switching transistor, and a fourth switching transistor; a first terminal of the first switching transistor is connected to the first node, and a second terminal of the first switching transistor is connected to the complementary bit line; a first terminal of the second switching transistor is connected to the second node, and a second terminal of the second switching transistor is connected to the bit line; a first terminal of the third switching transistor is connected to the first node, and a second terminal of the third switching transistor is connected to the bit line; a first terminal of the fourth switching transistor is connected to the second node, and a second terminal of the fourth switching transistor is connected to the complementary bit line.

11. The method according to claim 10, wherein the first switching transistor and the second switching transistor have same process parameters; in the charge sharing phase, the first switching transistor and the second switching transistor are turned on by a first voltage; in the sensing and amplification phase, a turn-on voltage of the first switching transistor and the second switching transistor gradually increases from the first voltage to a second voltage, to control the first switching transistor and the second switching transistor to be turned on; the first voltage is greater than or equal to a gate threshold voltage of the first switching transistor and the second switching transistor.

12. An electronic device, comprising:
a memory, comprising a sense amplifier and a sense amplifier control circuit,
wherein the sense amplifier comprises a first N-type transistor, a second N-type transistor, a first P-type transistor, and a second P-type transistor; a drain of the first N-type transistor, a drain of the first P-type transistor, and a gate of the second P-type transistor are connected to a first node; a drain of the second N-type transistor, a drain of the second P-type transistor, and a gate of the first P-type transistor are connected to a second node; a gate of the first N-type transistor is connected to a bit line and a gate of the second N-type transistor is connected to a complementary bit line; a source of the first P-type transistor and a source of the second P-type transistor are configured to connect to a power supply voltage, and a source of the first N-type transistor and a source of the second N-type transistor are configured to connect to ground; and
wherein the sense amplifier control circuit is configured to control the sense amplifier chronologically in an idle phase, an offset cancellation phase, a charge sharing phase, and a sensing and amplification phase that occur in sequence, wherein:
in the charge sharing phase, during which an activation signal is input to a word line corresponding to a storage unit connected to the sense amplifier, the sense amplifier control circuit is configured to control the first node to connect to the complementary bit line for a first predetermined duration and controlling the second node to connect to the bit line for the first predetermined duration, and then disconnect the connection between the bit line and the second node and the connection between the first node and the complementary bit line; and
in the sensing and amplification phase, the sense amplifier control circuit is configured to, in response to detecting that a voltage on the first node or a voltage on the second node reaches a predetermined voltage, control the first node to connect to the complementary bit line and the second node to connect to the bit line, to transmit an amplified voltage to the bit line and the complementary bit line.

13. The electronic device according to claim 12, wherein:
in the idle phase, the sense amplifier control circuit is configured to control the first node, the second node, the bit line, and the complementary bit line to connect to each other and connect to a predetermined equalization voltage;
in the offset cancellation phase, the sense amplifier control circuit is configured to disconnect the connection between the first node and the complementary bit line, the connection between the second node and the bit line, and the connection between the predetermined equalization voltage and each of the first node, the second node, the bit line, and the complementary bit line; and
in the charge sharing phase, the sense amplifier control circuit is configured to control the first node to connect to the complementary bit line for the first predetermined duration, and controlling the second node to connect to the bit line for the first predetermined duration.

14. The electronic device according to claim 13, wherein, in the charge sharing phase, the sense amplifier control circuit is configured to:
control the first node to connect to the second node for a second predetermined duration, and then disconnect the connection between the first node and the second node; and
after disconnecting the first node from the second node, control the first node to connect to the complementary bit line for the first predetermined duration and the second node to connect to the bit line for the first predetermined duration, and then disconnect the connection between the bit line and the second node and the connection between the first node and the complementary bit line.

15. The electronic device according to claim 14, wherein, in the charge sharing phase, the sense amplifier control circuit is configured to:
while controlling the first node to connect to the second node, control both the first node and the second node to connect to the predetermined equalization voltage; and
while disconnecting the connection between the first node and the second node, disconnect the connection between the predetermined equalization voltage and each of the first node and the second node.

16. The electronic device according to claim 13, wherein the sense amplifier comprises a precharge switching transistor, a first terminal of the precharge switching transistor is connected to the predetermined equalization voltage, a second terminal of the precharge switching transistor is configured to supply the predetermined equalization voltage, and the precharge switching transistor is configured to control at least one of the first node, the second node, the bit line, and the complementary bit line to connect to the predetermined equalization voltage or disconnect from the predetermined equalization voltage.

17. The electronic device according to claim 12, wherein:
in both the idle phase and the charge sharing phase, the sense amplifier control circuit is configured to control the source of the first P-type transistor and the source of the second P-type transistor to disconnect from the power supply voltage, and control the source of the first N-type transistor and the source of the second N-type transistor to disconnect from the ground; and
in both the offset cancellation phase and the sensing and amplification phase, the sense amplifier control circuit is configured to control the source of the first P-type transistor and the source of the second P-type transistor to connect to the power supply voltage, and control the source of the first N-type transistor and the source of the second N-type transistor to connect to the power supply voltage.

18. The electronic device according to claim 12, wherein the sense amplifier comprises a first switching transistor, a second switching transistor, a third switching transistor, and a fourth switching transistor; a first terminal of the first switching transistor is connected to the first node, and a second terminal of the first switching transistor is connected to the complementary bit line; a first terminal of the second switching transistor is connected to the second node, and a second terminal of the second switching transistor is connected to the bit line; a first terminal of the third switching transistor is connected to the first node, and a second terminal of the third switching transistor is connected to the bit line; a first terminal of the fourth switching transistor is connected to the second node, and a second terminal of the fourth switching transistor is connected to the complementary bit line.

19. The electronic device according to claim 18, wherein the first switching transistor and the second switching transistor have same process parameters; in the charge sharing phase, the first switching transistor and the second switching transistor are turned on by a first voltage; in the sensing and amplification phase, a turn-on voltage of the first switching transistor and the second switching transistor gradually increases from the first voltage to a second voltage, to control the first switching transistor and the second switching transistor to be turned on; the first voltage is greater than or equal to a gate threshold voltage of the first switching transistor and the second switching transistor.

20. The electronic device according to claim 12, wherein the sense amplifier control circuit is configured to amplify a voltage difference between the bit line and the complementary bit line that are connected to the sense amplifier.

* * * * *